Figure 1:
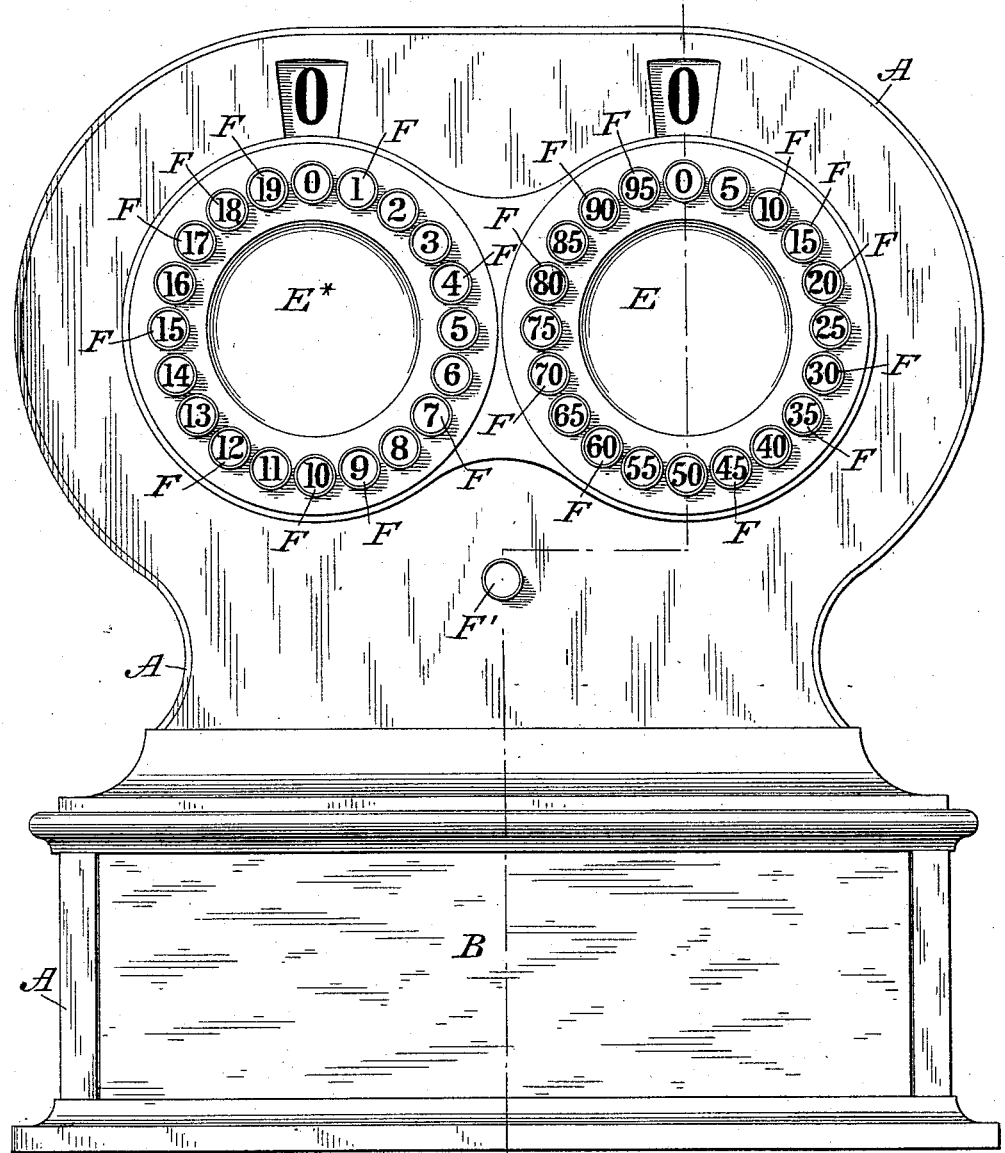

(No Model.) 4 Sheets—Sheet 1.

C. W. WEISS.
CASH REGISTER AND INDICATOR.

No. 469,003. Patented Feb. 16, 1892.

Attest:
A. N. Jeshrow
W. Kidder

Inventor:
Carl W. Weiss
by William B. Greeley
Atty.

(No Model.) 4 Sheets—Sheet 2.
C. W. WEISS.
CASH REGISTER AND INDICATOR.

No. 469,003. Patented Feb. 16, 1892.

Attest: Inventor:
Carl W. Weiss
by William B. Greeley
Atty.

(No Model.) 4 Sheets—Sheet 3.

C. W. WEISS.
CASH REGISTER AND INDICATOR.

No. 469,003. Patented Feb. 16, 1892.

Attest:
A. N. Jestron
W. Fidder

Inventor:
Carl W. Weiss
by William B. Gregley
Atty.

(No Model.) 4 Sheets—Sheet 4.

C. W. WEISS.
CASH REGISTER AND INDICATOR.

No. 469,003. Patented Feb. 16, 1892.

Attest:
A. N. Jesbera.
A. Widder.

Inventor:
Carl W. Weiss
by William B. Greeley
Atty.

UNITED STATES PATENT OFFICE.

CARL W. WEISS, OF BROOKLYN, ASSIGNOR TO THE KRUSE CASH REGISTER COMPANY, OF NEW YORK, N. Y.

CASH REGISTER AND INDICATOR.

SPECIFICATION forming part of Letters Patent No. 469,003, dated February 16, 1892.

Application filed July 24, 1891. Serial No. 400,575. (No model.)

*To all whom it may concern:*

Be it known that I, CARL W. WEISS, of Brooklyn, in the county of Kings and State of New York, have invented certain new and useful Improvements in Cash-Registers; and I do hereby declare that the following is a full and exact description thereof, reference being had to the accompanying drawings, and to the letters and figures of reference marked thereon, making a part of this specification.

My invention relates to cash indicating and registering machines of the type shown in Letters Patent of the United States, No. 443,024, granted to me December 16, 1890, and has for its object to further simplify and improve the construction thereof, and particularly to dispense with the crank for actuating the mechanism.

It consists in the novel construction and arrangement of various features of the machine, as hereinafter described and claimed.

In the drawings like letters and numerals of reference indicate like parts in the several figures and as far as possible the same letters and numerals of reference are employed to indicate like parts as those employed in my said patent, it being observed that in the present case I prefer to employ two separate indicating-dials and sets of keys for dollars and cents.

Figure 2:
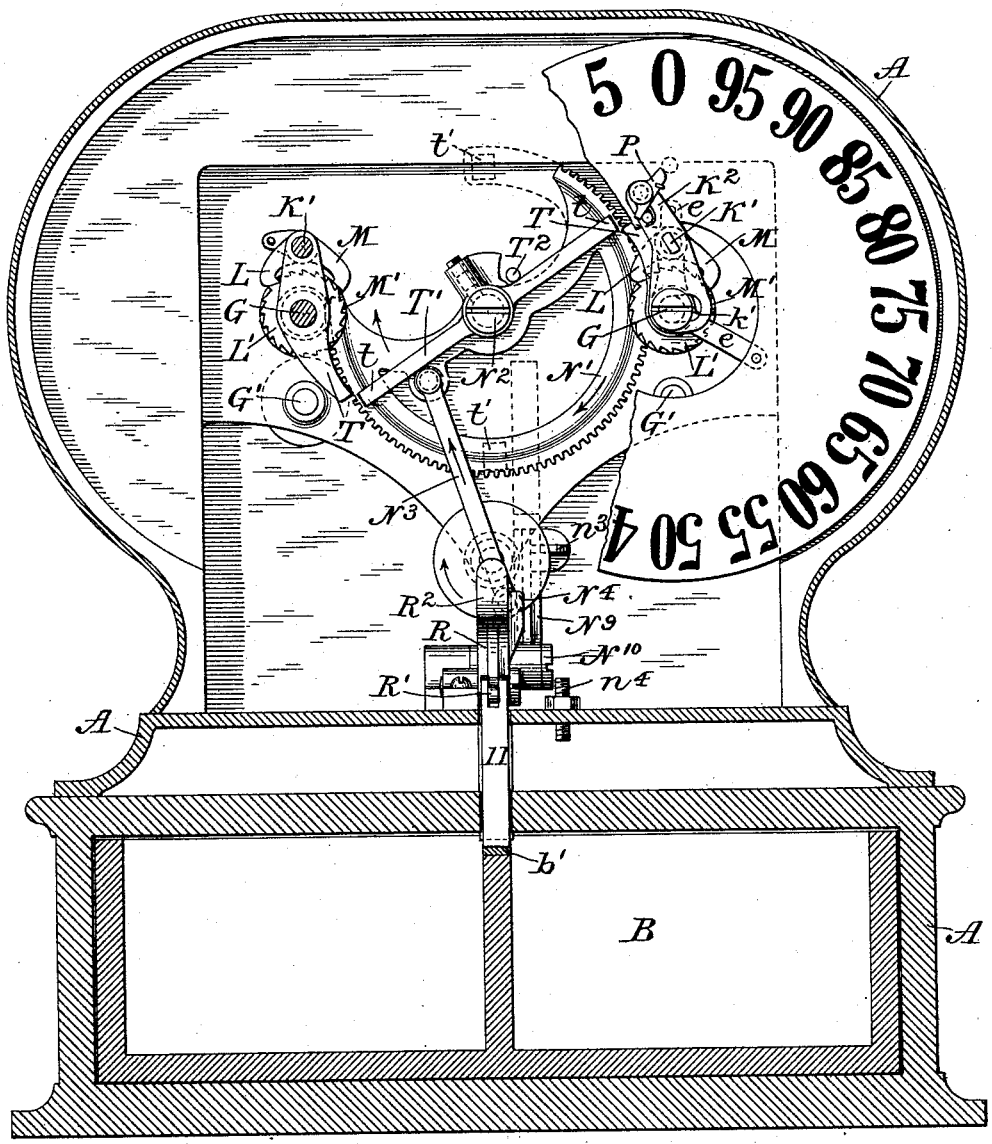
Figure 3:
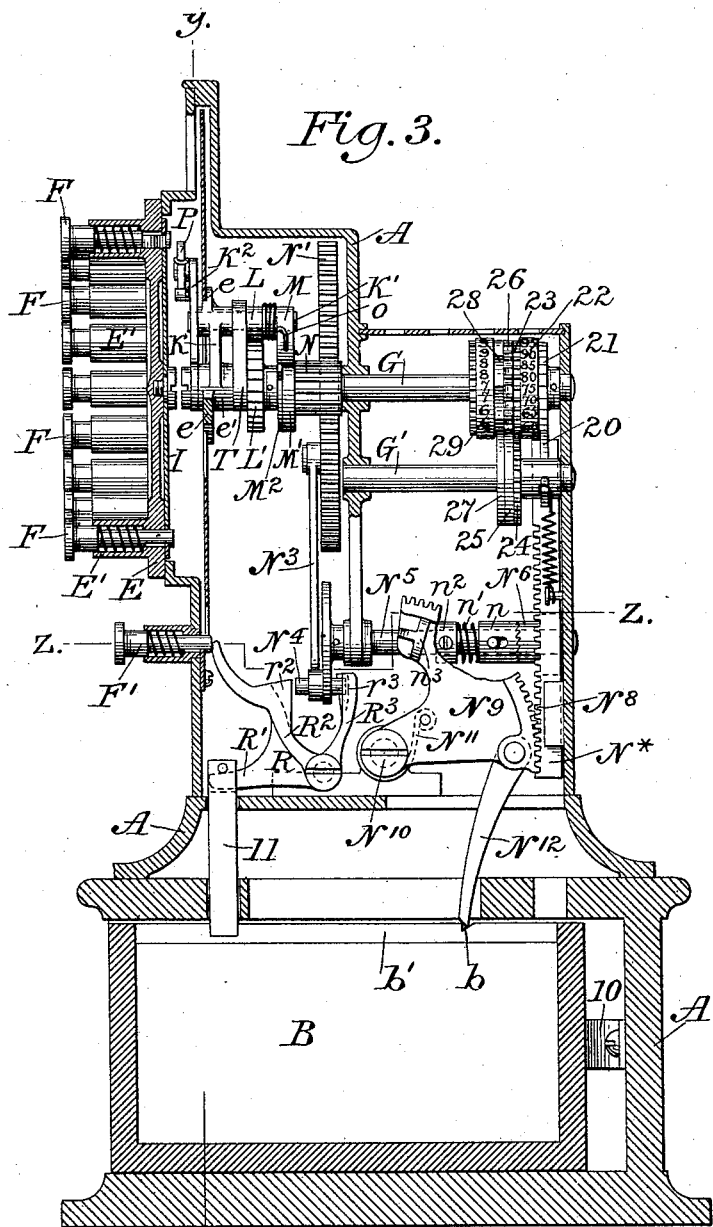
Figure 4:
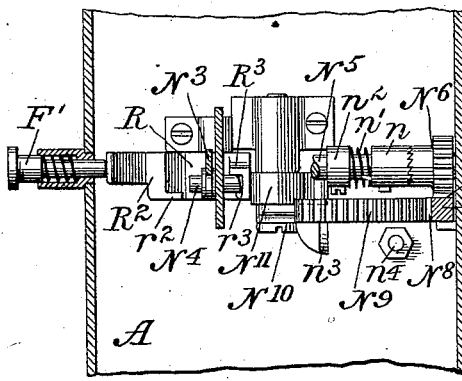
Figure 5:
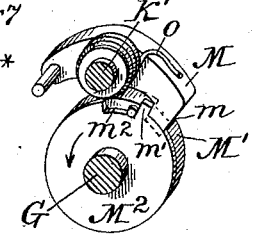
Figure 8:
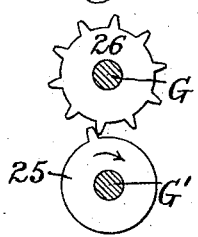
Figure 10:
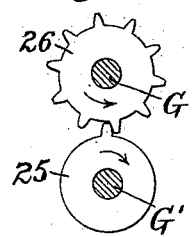
Figure 12:
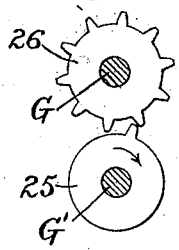
Figure 6:
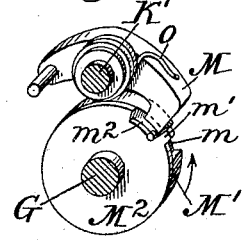
Figure 9:
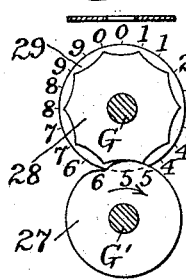
Figure 11:
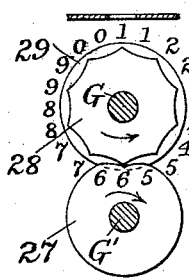
Figure 13:
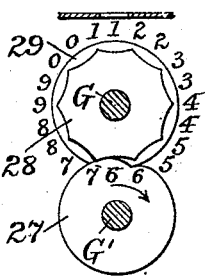
Figure 7:
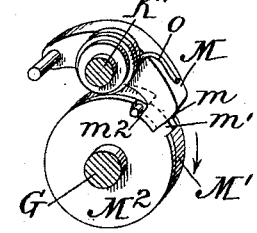

In said drawings, Figure 1 is a front elevation of my improved machine. Fig. 2 is a section on the line $y\ y$ of Fig. 3, parts being broken out to show other parts more clearly. Fig. 3 is a section on the line $x\ x$ of Fig. 1. Fig. 4 is a horizontal sectional detail on the line $z\ z$ of Fig. 3. Figs. 5, 6, and 7 are detail views showing different positions of the detent and disks; and Figs. 8, 9, 10, 11, 12, and 13 are detail views of parts of the adding mechanism, showing the same in different positions.

The casing A is of suitable shape to cover and protect the working parts of the machine. In its lower portion a drawer B is fitted to slide in and out. Upon its upper front portion are secured the plates E and E*, and above each plate the casing is apertured for a sight-opening. The plates are severally provided with a series of bosses E' E', within which slide the spring-pressed stops or keys F, which are notched to co-operate with the locking-disk I, the latter being notched and spring-actuated, all as in my said patent. In line with the center of the right-hand plate is mounted in suitable bearings a shaft G, upon the end of which near the front plate is fitted to rotate freely a dial-plate having marked upon it near its outer circumference, and in a position to be brought to view at the sight-opening, the several values corresponding to those of the keys carried by the plate E, which in this case increase by fives from 0 to 95, the 0 being the initial point. This dial-plate is preferably carried by arms $e\ e$, extending from a hub $e'$, and has its central portion removed. An arm K, carried by the same hub, provides a bearing in its outer end for the rotatory pin $K'$, parallel with the shaft G.

Fast upon the outer end of the pin $K'$ is an arm $K^2$, which is slotted at its inner end, as at $k'$, to embrace the end of the shaft G to permit of slight lost motion, and at its outer end bears a spring-actuated trip-latch P, which is made to register with the inner ends of the keys F F, and in such proximity thereto that when a key is pushed inward it will stand in the path of movement of the outer end of the latch. In the forward movement of the arm K from its initial position the latch P will trip and yield so as to pass by any key which may have been pushed in; but on the return movement the latch will not yield when it strikes a key F, but will operate to stop the arm K and dial and prevent their further movement.

Upon the pin $K'$ and near its rear end is pivoted a pawl L, adapted to engage a ratchet-wheel $L'$, which is fixed to the shaft G and has teeth corresponding in number with the keys F F, said teeth being inclined so that the pawl L will engage the wheel as the dial-plate and arm K are moving forward only. The pawl is pressed toward the teeth by a spring $o$.

Fast to the rear end of the pin $K'$ is a detent M, adapted to engage a single notch $m$ in the periphery of the disk $M'$, mounted to turn loosely on the shaft G, the engagement of the detent with the notch being enforced by the spring $o$. The detent M has a rearwardly-projecting beak which carries a pin overlying the pawl L to force the pawl against its ratchet-wheel L′ and lock the latter against accidental movement when the detent M is not in engagement with the disk M′.

The disk M′ is fast to a pinion N and also loose upon the shaft G, which meshes with an oscillating gear-segment N′, journaled on a stud N. Said segment is oscillated by means hereinafter described, and the amplitude of its oscillation is such that the pinion N and disk M′ receive a complete rotation first in one direction and then in the other.

In the initial position of the disk M′ the notch $m$ stands directly under the tooth of the detent M, and the detent would therefore engage the notch and make a complete rotation with the disk M′, carrying the dial-plate and pawl L with it if means were not employed to prevent the engagement at such time. To this end a second disk $M^2$, formed with a notch $m^2$ somewhat wider than the notch $m$ and with a tooth $m'$ projecting from its periphery, is mounted loosely upon the shaft G close to the disk M′. A pin in disk M′ enters the notch $m'$ and compels the two disks M′ $M^2$ to move together with some lost motion. In the initial position the parts are in the position represented in Fig. 5, with the notch $m$ closed by the disk $M^2$. The first movement of the pinion N in the direction of the arrow in said figure moves the first disk M′ through a complete rotation into position with the notch $m$ under the detent. The second disk $M^2$ moves with the first until the tooth $m'$ strikes the detent, as shown in Fig. 6, when the second disk $M^2$ will be stopped and the notch $m$ will be opened, as shown in Fig. 7, allowing the detent M to enter said notch. On the second or backward rotation of the disk M′ the detent M will be carried with it until it is thrown out by the partial rotation of the pin K′, due to the contact of the stop-pawl P with a depressed key F. The detent will then cease to move, while the disk M′ will continue to move until it returns to its initial position. Just before it reaches such position the tooth $m'$ on the second disk $M^2$ will strike the detent M, this time on the other side, causing the second disk $M^2$ to close the notch $m$ and restoring the disks M′ $M^2$ to their initial position. The dial-plate, detent M, and pawl L will be left in the position where they stopped until they are returned to their initial position as follows: On the next forward movement of the pinion N and disks M′ $M^2$ the tooth $m'$ of the second disk $M^2$, when it reaches the point where the detent M stopped, will contact with the detent, opening the notch $m$ and allowing the detent to enter the same, when the detent will be moved to its initial position, carrying with it the dial-plate and the pawl L, the latter during this movement passing idly over the teeth of the ratchet. I have referred to the disk $M^2$ as stopped by the engagement of its tooth with the detent; but it is evident that it might be stopped by any other part bearing a fixed relation to the detent, as the pawl L. During these movements the shaft G will be rotated only while the detent M is in engagement with the notch $m$ and the pawl L at the same time is in engagement with the ratchet L′. Consequently the shaft G is rotated only in the proper direction and to the proper extent to cause the adding mechanism S to increase the value shown at the sight-opening by the value of the key depressed.

In the foregoing description reference has been made to but one indicating mechanism, while two sets of keys are shown in Fig. 1; but it will be understood that the various devices described are duplicated for the other set of keys, one set of devices being used to indicate five cents and multiples thereof and the other to indicate dollars.

The means for oscillating the segmental rack N′ are as follows: A pitman $N^3$ is pivoted to the segment and to a crank-pin $N^4$, carried by a shaft $N^5$, and the relations of the several parts are such that a complete rotation of the shaft in one direction causes the rack N′ to oscillate to and fro and to return to its initial position. The shaft has a slipping-clutch connection with a pinion $N^6$ in mesh with a rack $N^7$ upon a rack-bar $N^*$, which reciprocates longitudinally in ways secured to the casing. The pinion $N^6$ is loose upon the shaft and has upon its inner end inclined teeth, which mesh with similar teeth upon the end of a sleeve $n$, held to the shaft to rotate therewith, but to move longitudinally thereon, as by a pin in one entering a slot in the other. The sleeve is held normally in engagement with the pinion by a spring $n'$, placed between the sleeve and a collar $n^2$, fixed upon the shaft. The inclination of the teeth is such that during the downward movement of the rack the shaft $N^5$ will be rotated, but during the upward movement thereof the teeth of the pinion $N^6$ will slip idly over the teeth of the sleeve $n$ without rotating the shaft. The rack-bar $N^*$ bears a second rack $N^8$, which meshes with a segmental rack or gear $N^9$, pivoted at $N^{10}$ and impelled downward by gravity or by a strong spring $N^{11}$. An arm $N^{12}$, carried by the segmental rack $N^9$, engages a notch $b$ in a bar $b'$, carried by the drawer B. The gear $N^9$ is thus a motor in place of the usual hand-operated devices for moving the drawer and actuating through suitable connections the working parts of the machine. The drawer is held as usual by a bolt 11, and when the bolt is withdrawn the drawer will be started out by the usual spring 10. The spring $N^{11}$ will then act through the rack $N^9$ both to throw the drawer farther out through the arm $N^{12}$ and to move the rack-bar $N^*$ downward, rotating the shaft $N^5$ and causing the oscillation of the segmental rack N′ through the described mechanism. In order that the parts may move only to the extent necessary to effect the desired results, a stop-lug $n^3$ is formed on the rack $N^9$ to contact with an adjustable pin $n^4$, supported by the frame-work. When the drawer is pushed in, it will restore the rack $N^9$ and rack-bar $N^*$ to their initial position, resetting spring $N^{11}$ in readiness for another movement.

The devices for releasing the drawer B and for locking the actuating mechanism against improper movement are all operated by the pushing in of a single key F', which is adapted to move a frame R, pivoted to swing in a plane at right angles to the plane of rotation of the crank-pin $N^4$. The frame is held normally in the position indicated in Fig. 3 by its own weight. Said frame R has one arm R', which lies beneath a pin projecting from the bolt 11 and which is adapted to raise the bolt and release the drawer when the frame is moved by the key F'. The frame also has two arms $R^2$ and $R^3$, having on their inner faces, respectively, wings $r^2$ and $r^3$, which are offset with respect to each other by a distance about equal to the diameter of the projecting crank-pin $N^4$, and which are separated in the direction of movement of the frame by a distance somewhat less than the length of said pin. In other words, the frame constitutes a locking escapement for said pin. Pressure upon the key F' raises the bolt 11 and moves the wing $r^3$ out of the path of the crank-pin, allowing the mechanism to move under the impulse of the spring $N^{11}$, and at the same time the wing $r^2$ moves into the plane of movement of the other end of the pin and on the other side, thereby preventing all possibility of movement of the pin in the wrong direction. To make it certain that the crank-pin cannot move in the wrong direction before the wing $r^2$ fairly engages the pin, the arm $R^3$ is recessed slightly, as shown in Fig. 4, to receive the inner end of the pin and confine it in position. The edge of the side wall of the recess may be beveled, so that the end of the pin may strike thereon and throw the frame backward slightly, thus permitting the pin to seat itself properly in the recess.

The escapement in its normal position operates as a locking device for the shaft $N^5$ and all the connected parts against the stress of the spring $N^{11}$ additional to and independent of the drawer B and its locking device, so that should the bolt 11 fail to operate for any reason the operating mechanism of the register will nevertheless be retained in proper position by said escapement. Furthermore, the key F' being held in until the dial comes to a stop the wing $r^2$ stands in the path of the crank-pin and checks it before it quite completes its rotation, receiving the impact of the blow. The key F' must then be released, allowing the wing $r^2$ to move out of the path of the pin to permit all the parts to move a slight distance farther and come to rest in their final position.

In Fig. 2 of the drawings I have shown a device for preventing positively any overthrow or movement of the detent and its connected parts backward beyond the zero-point when they are returned thereto from some other point. The lines thereof, which would otherwise appear in other figures, have been omitted therefrom to avoid confusion. The device is applied to both the right and the left hand dials; but for the sake of clearness I will describe first the device as it appears at the left in Fig. 2. An arm T is mounted loosely upon the shaft G as an axis, and has one end extended to engage with the end of the pin K', whereby the arm T is compelled to move with the detent M. The other end of said arm T is extended downward (when the parts are in normal position) and upon the side toward the segment N' the arm is concaved, substantially as shown. An arm T' is mounted frictionally upon the hub of the segment N' and is provided with an ordinary set-screw, as shown, for the purpose of regulating its frictional engagement with the hub. The arm T' extends toward the left and occupies such a relation with respect to the arm T that its end serves, under certain conditions, as a stop $t$ for said arm T. The arm T' moves with the segment N', as the latter begins its movements in either direction; but its movement is quickly checked by a pin $T^2$, which is fixed to the supporting-frame and enters an opening or notch between the arm itself and a flange carried by the hub of the arm, the hub of the segment N' slipping under the set-screw or other frictional device. When the mechanism is in its initial position, the arm T' occupies the position shown and the arm T may be in its zero position, as shown, or in any other position as it was left at the close of the last previous operation. As the segment N' begins its movement, the arm T' moves with it until it is checked by the pin $T^2$ with the stop $t$ in the path of movement of the arm T, so that the latter, when the detent is picked up by the disk M' and is returned to its zero or initial position, shall strike against the stop $t$ and be stopped thereby, together with the detent. When the segment N' begins its second or return movement, the arm T' moves with it until the stop $t$ has cleared the path of the arm T, so that it may not be in the way of the latter should the latter be moved to its 90 or 95 position.

At the right in Fig. 2 the arm T is partly obscured by the arm K. As before, said arm T is mounted upon the shaft G at its side of the register; but as it strikes against its respective stop $t$ only when said stop is in or near its highest position the arm T stands wholly above the shaft G and engages directly with the pin K. It is obvious also that to effect the result above referred to the stop $t$ might be fixed to the segment, as indicated in dotted lines at $t'$, in such position thereon as to be brought into the path of the arm T just as the segment completes its first movement.

The adding mechanism employed has been modified somewhat in order to simplify it and reduce the space occupied as well as the cost of manufacture. Heretofore, in order to combine an adding-wheel showing twentieths of a dollar with one showing dollars from one to ten, it has been necessary to employ gears of different sizes between the wheels. The consequence has been that it has been difficult to make the small gears with the accuracy necessary to prevent binding. I have found that the desired result may be accomplished through using intermediate gears of equal size and otherwise modifying the construction. Fast upon the shaft G is fixed the usual ratchet-wheel 21, with which co-operates the pawl 20 to prevent reverse movement, the adding-wheel 22 showing cents increasing by five from 0 to 95, and a gear 23, which meshes with a gear 24, mounted loosely on the shaft G'. Fixed to the gear 24 to rotate therewith is a gear 25, having a single tooth which actuates a gear 26, loose on the shaft G' and having ten teeth. The usual scalloped stop-gears 27 and 28 are employed to prevent movement of the gear 26, except when actuated by the tooth of the gear 25, the gear 28 having ten scallops. The adding-wheel 29 showing successive dollars from one to ten is secured to the gears 28 and 26 to operate therewith, and has the numbers from one to ten duplicated in succession upon its periphery, for a reason shortly to be described. It will be seen that as gears 23 and 24 have each twenty teeth and are of equal size the single tooth of gear 25 and consequently the gear 26 and the adding-wheel 29 are advanced only one-twentieth ($\frac{1}{20}$) of a rotation for each unit of movement of the adding-wheel 22, though the adding-wheel 29 shows but ten different numbers, or one for every two-twentieths ($\frac{2}{20}$) of its periphery. Suppose now that the adding mechanism already indicates "$4.95" and that an addition of five (5) cents is to be made. The gears 25, 26, 27, and 28 would then stand in the position shown in Figs. 8 and 9. The movement of the adding mechanism necessary to indicate this addition would advance the gears into the position shown in Figs. 10 and 11 and the dollar-wheel one-twentieth ($\frac{1}{20}$) of a rotation. This movement would be insufficient to expose the "5" were the adding-wheel 29 formed as usual; but as I devote one-twentieth ($\frac{1}{20}$) of the periphery to the number it is brought fully into view at the sight-opening. If the next addition were of five (5) cents, the gears would move into the position shown in Figs. 12 and 13, which would expose another twentieth of the dollar-wheel. Ordinarily this second twentieth would show a portion of the proper figure or would show a blank; but in the present case the number 5 is duplicated upon this second twentieth, and consequently the proper dollar-figure remains exposed for all successive amounts from five dollars to five dollars and ninety-five cents.

In the operation of the machine the key representing the value to be indicated and added—as, for example, the key representing forty cents—is pushed inward and held in by the engagement therewith of the locking-plate I. The key F is then pushed inward, thereby actuating the frame R to raise the bolt 11 and to move the wing $r^2$ from the path of the crank-pin $N^4$. The spring $N^{11}$ is then free to move the segmental rack downward. This movement of the rack throws the drawer outward, being assisted at the start by the spring 10. The rack-bar $N^*$ is also moved downward, thereby giving to the shaft $N^5$ and the crank-pin $N^4$ a complete rotation. The effect of this is to oscillate the segmental rack $N'$ to and fro, returning it to its initial position, and in so doing to give to the pinion N and disk $M'$ a complete rotation in one direction and then in the other. The notch in the disk $M'$ being closed by the disk $M^2$, as described, the disk will rotate under the detent without carrying the latter with it until it has completed its first rotation, when the notch will be opened, as stated, and the detent will engage with the disk. The second or return movement now begins and the detent is carried with the disk until the stop-pawl, which in the first movement yielded and passed under the end of the key 40, now strikes the said key, and thereby lifts the detent out of the notch. The disk continues to move until it reaches its initial position, while the detent remains where it was stopped. During the movement of the detent the pawl L is carried with it and rotates the ratchet-wheel and shaft G through a distance equal to that from 0 to 40, thereby adding 40 to the amount already indicated by the wheels. The dial-plate likewise moves and stops with the detent and the numeral 40 is left exposed at the sight-opening. The action of these devices in succeeding operations of the machine is the same, except so far as it is modified by the fact that the dial-plate, pawl, and detent stand at the beginning of the operation in the position in which they were left at the end of the last preceding operation. Under these conditions the disk begins its first movement alone, as before; but when the tooth of the second disk reaches the detent it will open the notch $m$ (or, rather, insure its being open, for it was not closed when the disk returned to its initial position because the detent was elsewhere than at the initial or 0 point) and allow the detent to engage therewith, and so carry the detent, pawl, and dial-plate with it back to the initial point. The conditions are now normal, and in the second or return movement of the disk the action will be as before, the detent being moved with the disk until it is thrown out and stopped by the key, which now stands in the path of the stop-pawl. The single operation above described having been completed, the drawer is pushed in, and by so doing the segmental rack $N^9$ and the rack-bar $N^*$ are restored to their original position against the stress of the actuating-spring $N^{11}$, the drawer being locked by the dropping of the bolt 11. The indicating mechanism is not moved during the restoration of racks $N^9$ and $N^*$ to their original position by reason of the fact that the inclined teeth on the end of the pinion $N^6$ slip idly over the teeth on the sleeve $n$.

In case a value is to be indicated which is presented on only one of the dials, the 0 key of the other set of keys must be pushed in, so that no indication or addition shall be made on that side. If the dollar-dial is not used at all, its 0 key may remain pushed in permanently.

I claim as my invention—

1. The combination, in a cash-register, of a drawer, indicating devices, a series of keys for controlling said devices, a motor, as a spring, and connections from said motor for throwing out said drawer and for actuating said indicating devices, a locking device for said motor, and a single key independent of the indicator-keys for controlling said locking device and releasing said motor, substantially as shown and described.

2. The combination, in a cash-register, of a drawer, indicating devices, a series of keys for controlling said indicating devices, a spring-impelled motor-gear, connections between said gear and drawer for throwing out the latter and between said gear and indicating devices for transmitting the movement of the gear to said devices, and means independent of said keys for locking and releasing said drawer and said motor, substantially as shown and described.

3. The combination, in a cash-register, of a spring-impelled motor-gear, a shaft carrying a crank-pin, gearing between said motor-gear and shaft, including a slipping clutch, indicating devices, an actuating-pinion therefor, a rack engaging said pinion, and a pitman connecting said rack with said crank-pin, substantially as shown and described.

4. The combination, in a cash-register, of a spring-impelled motor-gear, a shaft carrying a crank-pin, gearing intermediate said motor-gear and shaft, means for transmitting motion from said shaft to the indicating devices, a locking-escapement for said crank-pin, and a key for actuating said escapement, substantially as shown and described.

5. The combination, in a cash-register, of spring-impelled gearing for actuating the indicating devices, including a rotating pin, a drawer, a bolt for locking said drawer, a swinging frame having a locking-escapement for said pin and having and arm to engage said bolt, and a key for actuating said swinging frame, substantially as shown and described.

6. The combination, in a cash-register, of a drawer, a spring-impelled segmental rack, an arm carried by said rack and engaging said drawer, a sliding rack-bar engaging said segmental gear, a shaft having a pinion also engaging said rack-bar and carrying a crank-pin, a rack adapted to actuate the indicating mechanism, and a pitman connecting said rack with said crank-pin, substantially as shown and described.

7. The combination, with a notched driving-disk and an arm revolving loosely on the axis of said disk, of a detent carried by said arm, and a second notched disk mounted upon the axis of said first-named disk and having lost-motion connection therewith and provided also with a tooth adapted to strike said detent, substantially as shown and described.

8. The combination, with a ratchet-wheel, notched driving-disk rotating loosely on the axis of said wheel, an arm revolving loosely on said axis, and a pawl carried by said arm and adapted to engage the teeth of said ratchet-wheel, of a detent also carried by said arm, and a second notched disk mounted upon the axis of the first and having lost-motion connection therewith and provided with a tooth adapted to strike said detent, substantially as shown and described.

9. The combination of a shaft G, a rotatable disk M′, a detent M, adapted to be rotated thereby and to be engaged therewith or disengaged therefrom, an arm T, rotating with said detent, a pinion N and gear N′ for actuating said disk, and a stop carried by said gear and adapted to be moved thereby into the path of said arm, substantially as shown and described.

In testimony whereof I have signed my name to this specification in the presence of two subscribing witnesses.

CARL W. WEISS.

Witnesses:
A. N. JESBERA,
A. WIDDER.